April 28, 1931. J. W. OGLETREE 1,802,570
METHOD AND APPARATUS FOR PRODUCING VISUAL DEPTH IN PROJECTION PICTURES
Filed June 7, 1929 2 Sheets-Sheet 1
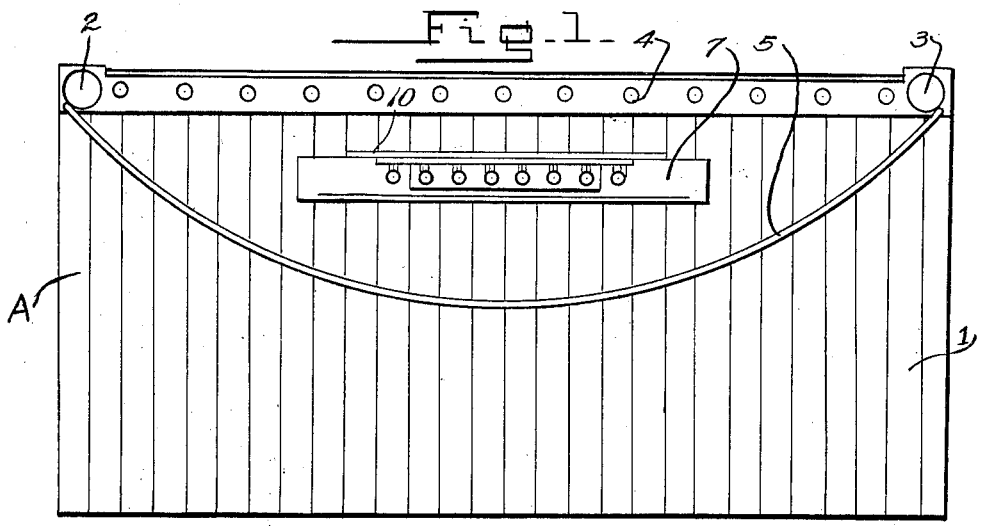
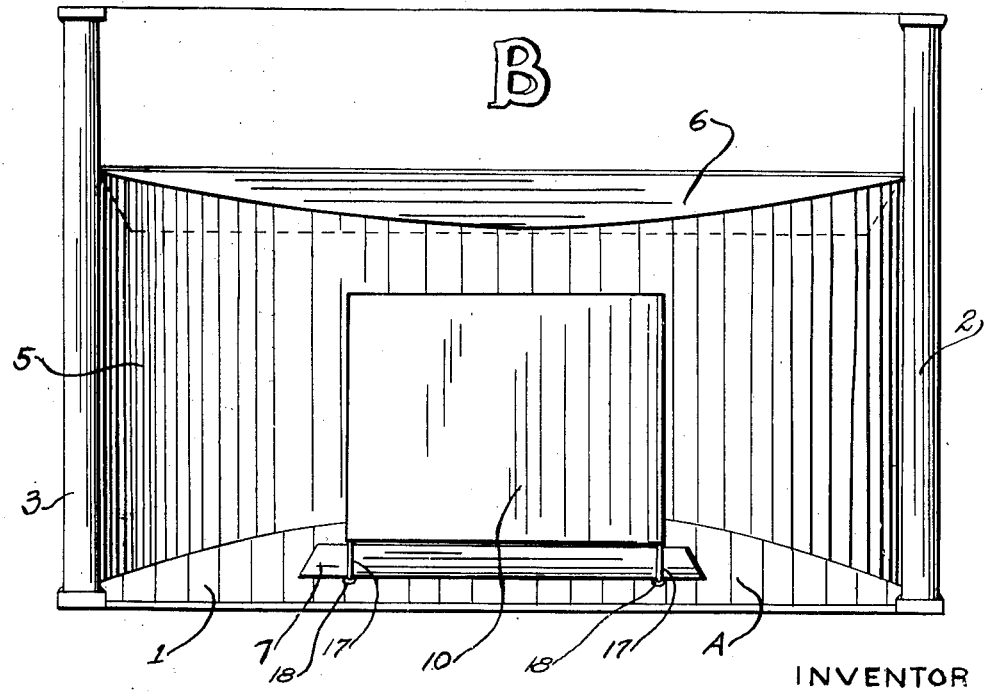
INVENTOR
Joseph W. Ogletree
BY
ATTORNEY April 28, 1931. J. W. OGLETREE 1,802,570
METHOD AND APPARATUS FOR PRODUCING VISUAL DEPTH IN PROJECTION PICTURES
Filed June 7, 1929   2 Sheets-Sheet 2
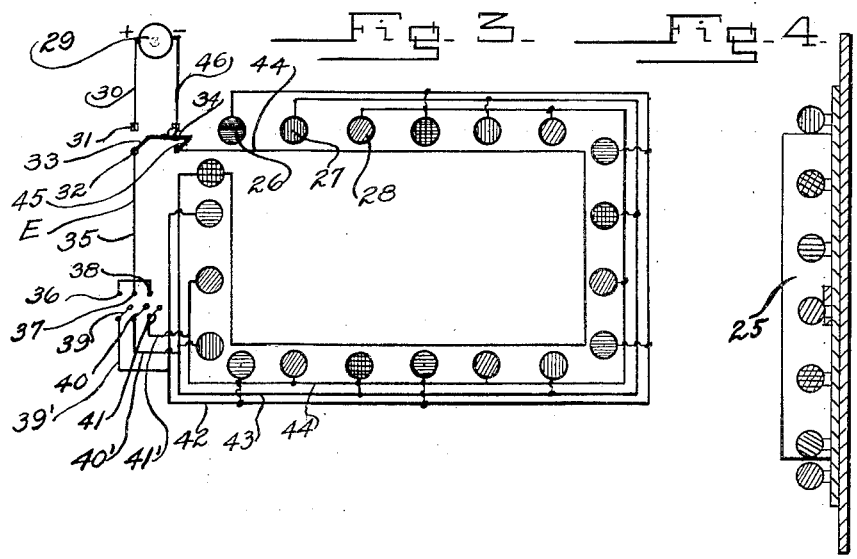
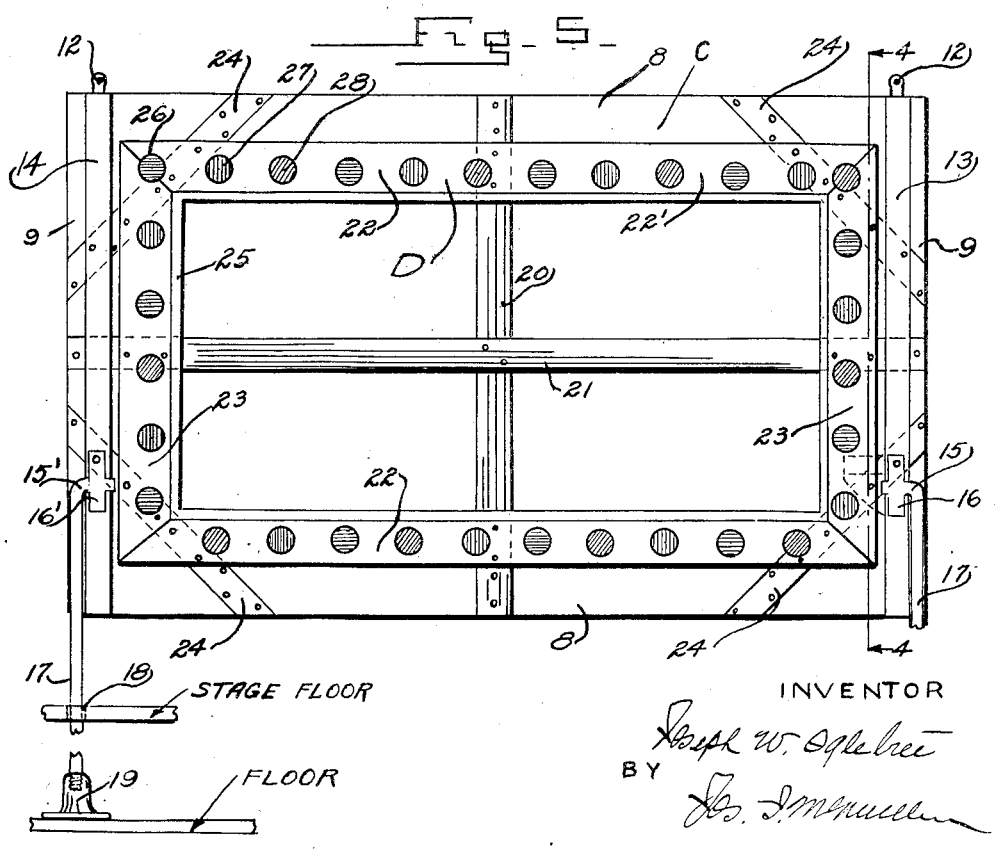
INVENTOR
Joseph W. Ogletree
BY
ATTORNEY Patented Apr. 28, 1931

1,802,570

UNITED STATES PATENT OFFICE

JOSEPH W. OGLETREE, OF THE UNITED STATES ARMY, FORT SLOCUM, NEW YORK

METHOD AND APPARATUS FOR PRODUCING VISUAL DEPTH IN PROJECTION PICTURES

Application filed June 7, 1929. Serial No. 369,239.

(GRANTED UNDER THE ACT OF MARCH 3, 1883, AS AMENDED APRIL 30, 1928; 370 O. G. 757)

This invention described herein may be manufactured and used by or for the Government for governmental purposes, without the payment to me of any royalty thereon.

This invention relates to motion picture projection, more especially it is directed to an improved method and apparatus for illuminating the media surrounding the projection screen with a light refrangibly differing from that of the picture for the purpose of eliminating eye strain and at the same time imparting to the picture an appearance of depth thus rendering it more attractive and natural.

One of the objects of this invention is to provide a method and apparatus of the character designated wherein the background of the screen is illuminated by light rays projected from the rear of the screen, the rays being of a predetermined color with respect to the color tone of the picture so as to materially soften the contrast between the picture and its background, thereby effectively abolishing eye strain so noticeable with existing projection arrangements.

Another object of this invention is to enable the observer to view the picture as if it were suspended in space by projecting the picture onto a surface located central of an area illuminated in a color contrasting with that of the picture, the illuminated area being defined by light absorbing curtains disposed in a predetermined manner with respect to each other.

Another object of this invention is to provide a stage setting in the nature of a vertically suspended black cycloramic curtain extending from the opposite forward corners of the stage, with its upper edge abutting a horizontally disposed black canopy, the canopy and curtain defining a semi-circular area in the center of which is located the projection screen.

Other objects of this invention are to provide a projection surface to the rear of which is attached a light supporting and reflecting assembly both of which may be quickly and conveniently removed from the stage as a unit whenever necessary; to produce a simple electrical control of the selective type for the different groups of colored lights and finally to afford a stage setting and illuminating assembly which will function when properly associated to greatly enhance the beauty of the picture with but a comparatively small outlay over the present cost of screen construction and installation.

Heretofore, in motion picture projection, various means have been resorted to for the purpose of creating an illusion of depth and obliterating eye strain such as bordering the screen with all or certain colors of the spectrum so that the difference in the refraction of these colors will cause the observer to interpret the picture in three dimensions or by projecting directly on the face of the screen, light rays contrasting in color with that of the picture and while these efforts have to some extent given satisfaction, they have not completely produced the effect desired and it is therefore the purpose of this invention to provide a method and apparatus which will completely remove the optical strain to which the observer is subjected when viewing the present screen productions by positioning the screen in the center of a space defined by light absorbing surfaces and illuminating the space with light rays contrasting in color with that of the picture, the contrast between the picture and its background serving not only to reduce eye strain but by virtue of the blending between the light of the picture and that of the space in which it is situated functions to create an impression of depth.

Referring more particularly to the accompanying drawings in which corresponding parts are indicated by similar reference characters, Fig. 1 is a top plan view with the upper curtain being removed showing the stage sight, the location of the cycloramic curtain with respect to the projection screen and the illuminating and reflecting means attached to the rear of the screen, Fig. 2 is a front elevation illustrating the complete stage setting, and the screen, Fig. 3 is a diagrammatic view of the circuits for effecting selective control of the lights, Fig. 4 is a transverse vertical section taken on the line 4—4 of Fig. 5, and Fig. 5 is a fragmentary sectionized rear elevation of the projection screen, the lamp supporting and reflecting assembly and the means for mounting the screen on the stage.

Briefly stated, this invention embodies a stage setting in the nature of a vertically suspended black surfaced cycloramic curtain disposed between the opposite forward corners of the stage and a similar surfaced horizontal canopy, the latter and the cycloramic curtain producing a semi-circular stage sight, a projection screen situated approximately central of the sight, a floor cloth of light absorbing material disposed upon the stage and beneath the projection screen, the cloth projecting rearwardly and laterally from the screen, a lamp supporting and reflecting assembly attached to the rear of the screen, a series of varied colored lights carried by said assembly and suitable lighting circuits for selectively controlling the colored lights in groups, dependent upon the color of the picture.

To facilitate the further discussion of this invention it will be hereinafter considered in the following order, stage setting assembly, projection screen construction and its mounting, lamp supporting and reflector assembly, lamp circuits, operation and conclusion.

*Stage setting assembly.*—Coming now to the first mentioned assembly there is shown (Figures 1 and 2) a stage A, including the floor (1) opposite corner posts (2) and (3) and the usual footlights (4). The stage may be of any construction and the parts referred to have been specified for descriptive purposes only.

Mounted on the stage is a setting B, composed of a black cycloramic curtain (5) situated forward of the stage and between the corner posts (2) and (3). If desirable, curtain (5) may be formed in two or three sections with edges overlapping instead of the unitary structure shown. Likewise, while susceptible of being mounted in various ways, the curtain is preferably arranged in the form of a fly so that it may be quickly raised and lowered as the situation demands.

The lower edge of curtain (5) which is suitably weighted, trails the stage floor while its upper edge abuts the lower surface of a black canopy (6), disposed horizontally of the stage flooring as shown in Fig. 2 of the drawings. Canopy (6) which may also be in the form of a "fly" and curtain (5) when disposed as stated produce a stage "sight" semicircular in configuration.

Arranged approximately central of and on the floor of the stage is a black cloth (7), the purpose of which will hereinafter appear. Although the curtain, canopy and floor cloth have been referred to as being of black material, it is to be understood any material will suffice provided the effective surface is black.

*Screen frame and mounting.*—Suspended and anchored midway between the stage floor and the canopy and between the extremities of the cycloramic curtain is a rectangular screen frame, C, composed of suitably mitered parallels (8) and (9). A projection screen (10) is stretched over the outer face of the frame and suitably laced or otherwise secured to the parallels thereof in the usual manner, the attachment of the curtain to the frame being concealed by a border of any desirable material.

Attached to the rear surface of and coextensive with parallels (8) and (9) of the screen frame are two posts (13) and (14) provided at their upper extremities with suitable eyelets (12) adapted to be engaged by the suspension wires of the screen not shown. Adjacent their lower ends posts (13) and (14) are formed with transversely extending recesses (15) and (15') adapted to be covered by the swivelly mounted keeper plates (16) and (16'), the recesses and their keeper plates constituting seats for the inwardly bent extremities of screen legs (17), which pass through openings (18) in the stage floor, and have their lower ends screwthreaded into the feet (19) attached to the structure underlying the stage as clearly shown in Fig. 5 of the drawings.

With this construction it is apparent to remove the projection screen from the stage it is merely necessary to unseat the upper ends of legs (17) and then elevate the frame into the flies after which the legs (17) may be unscrewed from their anchoring feet (19) and removed. To reinforce the frame and at the same time provide an attaching bed for the lamp supporting and reflector assembly, intersecting braces (20) and (21) are connected at their extremities to the parallels of the frame as clearly shown in Fig. 5 of the drawings.

*Lamp supporting and reflector assembly.*—Secured to the rear of the projection screen is a lamp supporting and reflector assembly D embodying a rectangular frame (22) composed of a top and bottom parallel (22') and end parallels (23) suitably mitered at their meeting extremities and attached to the intersecting braces (20) and (21) and corner braces (24) extending across the corner of the screen frame as clearly shown in Fig. 5 of the drawings. The dimensions of frame (22) are such that when it is properly bolted to its attaching bed the outer edges of the frame will be spaced about one foot from those of the lamp supporting frame.

The inner edges of the respective parallels of frame (22) are each provided with projections (25) which extend at right angles to the components of the frame. The inner surface of the frame and the adjacent edges of projection (25) are covered with tin and the latter coated with light gloss enamel for the purpose of providing reflecting surfaces for the incandescent lamps hereinafter to be referred to.

Suitable aligned sockets (not shown) are adapted to be secured to the rear faces of parallels (22') and (23) to receive the varied colored incandescent lamps (26), (27) and (28) which in the present instance are blue, red and green respectively. It is to be understood however, these colors may be altered dependent upon the character of the film being run. In the actual construction these lamps are arranged about four inches apart so that the number of lights actually in service are considerably in excess of those shown on the drawings.

*Lighting circuits.*—In order to light the varied colored lamps in groups a lighting circuit E is provided consisting of a source of electrical energy (29), positive conductor (30), switch points (31) and (32), blade (33) of double throw switch (34), conductor (35) and switch points (36), (37) and (38).

From these switch points the current is conducted through blades of switches (39), (40) and (41) and conductors (39'), (40') and (41') to conductors (42), (43) and (44) through the lamps from whence it is returned via the common conductor (44) and blade (45) of switch (34) and conductor (46) to the negative side of source (29). With this circuit arrangement it is evident the different colored lights may be selectively illuminated in groups according to color by throwing the switches (39), (40) and (41) which may be located either in the operator's booth or at some convenient point back stage.

Having described the structural details of this invention, its operation is as follows:

With the various elements of the apparatus forming the subject matter of this application assembled as stated the picture is projected upon the screen and at the same time the requisite switch is operated controlling the circuit of the group of colored lights required for the particular tint of the picture projected, which experiment has been shown to be as follows:

(a) Blue lighting effect with red tinted film.

(b) Red lighting effect with blue tinted film.

(c) Red lighting effect with green tinted film.

(d) Blue lighting effect with green tinted film.

(e) Green lighting effect with black and white film.

(f) Blue lighting effect with amber tinted film.

As the colored lights are turned on the light rays emanating from the back of the screen are directed upwardly to the canopy, downwardly to the floor cloth and laterally and rearwardly to the cycloramic curtain, to frame the picture in a field of colored light, which, blending with the color tone of the picture produces a perfect congruity in softening contrast between the image and the immediate vicinity of the screen. This lighting illusion serving ostensibly to eliminate eye strain also because of the difference in the refrangibility of the colors accomplishes another important mission in that it gives a third dimension or depth to the image and the observer is not at all conscious of the flatness of the image.

In conclusion it is evident this invention will enhance the inherent beauty of the projected image with a minimum of stage accessories, completely remove the present viewing discomfortures and effect an illusion of depth without involving use on the part of the observer of such auxiliary instrumentalities as colored glasses and the like as heretofore required for the purpose.

Although in the foregoing certain elements have been described as best adapted to perform the functions allotted to them, nevertheless it is to be understood that various minor changes may be resorted to within the scope of the appended claims without departing from or sacrificing any of the principles of the invention.

What I claim as new and wish to secure by Letters Patent is:

1. A method of relieving eye strain and producing visual depth in projected pictures consisting in defining a background with light absorbing material, centering an opaque projection screen in the background, projecting a picture upon the screen, the picture having a predetermined color tone and then diffusing the background with a subdued colored light, the latter emanating from the back of the screen and being adapted to blend with the color tone of the picture to produce a softening effect between the picture and the immediate vicinity of the screen.

2. A method of relieving eye strain and producing visual depth in projection pictures consisting in projecting a picture upon an opaque screen, the picture having a predetermined color tone, enclosing the screen with light absorbing material to provide a background of predetermined area, illuminating the background, the intensity and color tone of the illumination being such as to effect a field of subdued light completely surrounding the screen and blending with the color tone of the picture to produce a softening contrast between the picture and the immediate vicinity of the screen.

3. A method of relieving eye strain and producing visual depth in projection pictures consisting in providing a light absorbing enclosure, centering an opaque screen in the enclosure, projecting a picture upon the screen, the picture having a predetermined color tone and then illuminating the enclosure with light rays directed from the back of the screen, the intensity and the color tone of the light rays being such as to effect a field of subdued light completely surrounding the screen and blending with the color tone of the picture to produce a softening contrast between the picture and the immediate vicinity of the screen.

4. A method of relieving eye strain and producing visual depth in projection pictures consisting in providing a light absorbing enclosure, centering an opaque projection screen within the enclosure, projecting a picture upon the screen, the picture having a predetermined color tone, illuminating the area between the boundaries of the screen and enclosure with light rays, the intensity of the rays and their color tone being such as to effect a field of subdued light surrounding the screen and blending with the color tone of the picture.

5. A method of relieving eye strain and producing visual depth in projection pictures, consisting in directing light rays upwardly, downwardly and laterally from the rear of an opaque projection screen, intercepting the rays with light absorbing surfaces to form a field of colored light around the screen, projecting a picture on the screen, the picture having a predetermined color tone, the intensity of the light field and its color tone thereof being such as to blend with the color tone of the picture to produce a softening contrast between the picture and the immediate vicinity of the screen.

6. An apparatus of the character described comprising in combination a light absorbing enclosure, an opaque projection screen disposed centrally of the enclosure, the screen being adapted to receive a picture of a predetermined color tone, and means for projecting colored light rays from the rear of the screen to the surrounding surfaces of the enclosure, the intensity and color tone of the light rays projected from the rear of the screen being such as to effect a field of subdued light surrounding the screen and blending with the color tone of the picture to produce a softening contrast between the projected picture and the immediate vicinity of the screen.

7. An apparatus of the character described, the combination of a light absorbing enclosure, an opaque projection screen situated centrally of the enclosure, the screen being adapted to have a picture of a predetermined color tone thrown thereon, a light supporting and reflecting assembly associated with the rear of the screen, a plurality of different colored lights supported by the assembly and means for selectively controlling the lights in groups according to color to effect a colored light field completely surrounding the screen, the intensity and color tone of the field being such as to blend with the color tone of the picture to produce a softening contrast between the picture and the immediate vicinity of the screen.

8. An apparatus of the character described, the combination of a horizontal support, a cycloramic curtain vertically disposed on the support, a canopy horizontally positioned upon the upper edge of the curtain, the effective surfaces of the canopy and curtain being such as to provide a light absorbing enclosure, an opaque projection screen centrally located within the enclosure, the screen being adapted to have a picture thrown thereon of a predetermined color tone, a light supporting and reflecting assembly attached to the rear of the screen and embodying a frame, a plurality of different colored lights mounted in alignment on the frame, means for operating the lights in groups according to color, and additional means connected with the frame for directing the light rays upwardly, downwardly and from the sides of the frame to effect a field of light completely surrounding the screen, the intensity of the light and its color tone being such as to blend with the color tone of the picture to produce a softening contrast between the latter and the immediate vicinity of the screen.

JOSEPH W. OGLETREE.